DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 9, 1974

921 O.G. 440

T921,011

METHACRYLATE POLYMER POWDER COATING ADMIXED WITH CELLULOSE ACETATE BUTYRATE HAVING RESISTANCE TO HYDROLYSIS

George O. Cash, 2220 Hermitage Drive, Kingsport, Tenn. 37664

Filed Sept. 19, 1973, Ser. No. 398,905
Int. Cl. C08b *21/06*
U.S. Cl. 260—17 R
No Drawing. 10 Pages Specification

Disclosed is a powder coating comprised of an admixture of a cellulose acetate butyrate, an addition copolymer of methyl methacrylate and ethyl methacrylate and a plasticizer. The coating can be applied to a heatable substrate in powder form and caused to fuse by application of heat to produce a desirable coating having an unobviously high resistance to hydrolysis.